United States Patent
Hendrickson et al.

(10) Patent No.: US 12,190,698 B2
(45) Date of Patent: Jan. 7, 2025

(54) SYSTEMS AND METHODS FOR AUTOMATIC SPOTTING AND SAFETY INDICATOR DEPLOYMENT

(71) Applicants: Matthew Cole Hendrickson, North Ogden, UT (US); Matthew Todd Hendrickson, North Ogden, UT (US); Nicholas Todd Hendrickson, North Ogden, UT (US)

(72) Inventors: Matthew Cole Hendrickson, North Ogden, UT (US); Matthew Todd Hendrickson, North Ogden, UT (US); Nicholas Todd Hendrickson, North Ogden, UT (US)

(73) Assignee: Matthew Cole Hendrickson, North Ogden, UT (US)

( * ) Notice: Subject to any disclaimer, the term of this patent is extended or adjusted under 35 U.S.C. 154(b) by 0 days.

(21) Appl. No.: 18/312,515

(22) Filed: May 4, 2023

(65) Prior Publication Data
US 2023/0360509 A1    Nov. 9, 2023

Related U.S. Application Data

(60) Provisional application No. 63/364,174, filed on May 4, 2022.

(51) Int. Cl.
*G08B 21/04* (2006.01)
*G06T 3/02* (2024.01)
*G06V 10/764* (2022.01)

(52) U.S. Cl.
CPC ........... *G08B 21/0469* (2013.01); *G06T 3/02* (2024.01); *G06V 10/764* (2022.01); *G08B 21/0476* (2013.01); *G08B 21/0492* (2013.01)

(58) Field of Classification Search
CPC ............ G08B 21/0469; G08B 21/0476; G08B 21/0492; G08B 21/08; G06T 3/02; G06V 10/764; G06V 20/52
See application file for complete search history.

(56) References Cited

U.S. PATENT DOCUMENTS

| | | | |
|---|---|---|---|
| 8,384,780 B1 * | 2/2013 | Frank | G06T 5/90 348/148 |
| 10,055,648 B1 * | 8/2018 | Grigsby | G06F 18/24 |

(Continued)

OTHER PUBLICATIONS http://vision.stanford.edu/teaching/cs231b_spring1213/papers/CVPR05_DalalTriggs.pdf (Year 2005).

*Primary Examiner* — An T Nguyen
(74) *Attorney, Agent, or Firm* — Maschoff Brennan

(57) ABSTRACT

Embodiments of the present disclosure relate to operations related to extracting subsections of an obtained image corresponding to an environment. The operations may further include, determining one or more gradients of pixel intensities corresponding to the subsections of the obtained image. Further, determining one or more vectors based on a frequency corresponding to the one or more gradients of pixel intensities corresponding to the subsections corresponding to the obtained image. The operations may further include classifying one or more characteristics corresponding to the obtained image using one or more machine learning models and detecting a presence of one or more safety triggers in the environment based on the one or more determined vectors corresponding to the one or more subsections of the obtained image. Further, the operations may include automatically deploying a safety indicator based on the detecting the presence of the one or more safety triggers in the environment.

14 Claims, 6 Drawing Sheets

(56) References Cited

U.S. PATENT DOCUMENTS

| | | | |
|---|---|---|---|
| 10,931,934 B2* | 2/2021 | Richards | H04N 13/246 |
| 11,643,174 B2* | 5/2023 | Kato | B63B 34/60 |
| | | | 114/55.5 |
| 2018/0043977 A1* | 2/2018 | Assal | G06V 40/23 |
| 2018/0089980 A1* | 3/2018 | Snyder | G08B 3/10 |
| 2020/0050893 A1* | 2/2020 | Suresh | G06T 11/40 |
| 2023/0002022 A1* | 1/2023 | Uggeri | G08B 21/08 |

* cited by examiner

SYSTEMS AND METHODS FOR AUTOMATIC SPOTTING AND SAFETY INDICATOR DEPLOYMENT

CROSS-REFERENCE TO RELATED APPLICATION

This patent application claims the benefit of and priority to U.S. Provisional App. No. 63/364,174 filed May 4, 2022, titled AUTOMATIC BOAT SPOTTING SYSTEM, which is incorporated by reference in its entirety.

FIELD

The embodiments discussed in the present disclosure are generally related to systems and methods for automatic spotting and safety indicator deployment.

BACKGROUND

Safety indicators may be used in a variety of applications such as, for example, field sports, water sports, medicine, aviation, ego-machines, etc. These safety indicators may be configured to communicate one or more messages to one or more other systems, individuals, and others regarding safety and/or an increased amount of risk that may be present in an environment.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a method may include extracting one or more subsections of an obtained image that may correspond to an environment. In some embodiments, the method may additionally include determining one or more gradients of pixel intensities that may correspond to the one or more subsections of the obtained image. The method may additionally include determining one or more vectors that may be based on a frequency corresponding to the one or more gradients of pixel intensities that may correspond to the one or more subsections that may correspond to the obtained image. In some embodiments, the method may additionally include classifying, using one or more machine learning models, one or more characteristics that may correspond to the one or more subsections of the obtained image that may be based on the one or more determined vectors. In some embodiments, the method may additionally include detecting a presence of one or more safety triggers that may be in the environment and that may be based on the one or more classified characteristics that may correspond to the one or more subsections of the obtained image. In some embodiments, the method may additionally include automatically deploying a safety indicated based on the detecting the presence of one or more safety triggers in the environment.

The objects and advantages of the embodiments may be at least partially realized and/or at least partially achieved by the elements, features, and/or combinations particularly pointed out in the claims. These and other objects, aspects, features and advantages may become more fully apparent from the following brief description of the drawings, the drawings, the detailed description of preferred embodiments and appended claims Both the foregoing general description and the following detailed description are given as examples and are explanatory and are not restrictive of the invention, as claimed.

BRIEF DESCRIPTION OF THE DRAWINGS

The appended drawings contain figures of exemplary embodiments to further illustrate and clarify the above and other aspects, advantages and features of the present invention. It will be appreciated that these drawings depict only exemplary embodiments and are not intended to limit its scope. Additionally, it will be appreciated that while the drawings may illustrate exemplary sizes, scales, relationships, and/or configurations of the invention, the drawings are not intended to limit the scope of the claimed invention. Exemplary embodiments will be described and explained with additional specificity and detail through the use of the accompanying drawings in which:

DETAILED DESCRIPTION

Figure 1:
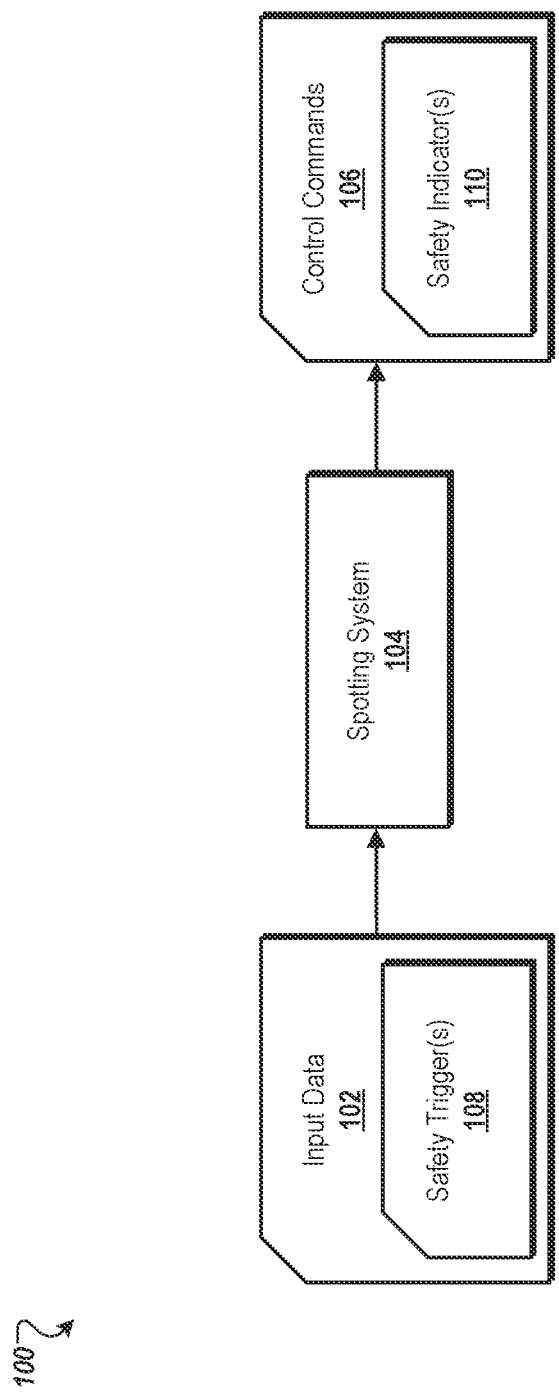
FIG. 1 illustrates an example environment for automatically deploying a safety indicator.

The present invention is directed towards systems and methods for automatic spotting and safety indicator deployment. The principles of the present invention, however, are not limited to systems and methods for automatic spotting and safety indicator deployment. It will be understood that, in light of the present disclosure, the systems and methods for automatic spotting and safety indicator deployment disclosed herein can be successfully used in connection with other types of spotting, safety indicator deployment, and the like.

Additionally, to assist in the description of the systems and methods for automatic spotting and safety indicator deployment, words such as top, bottom, front, rear, right and left are used to describe the accompanying figures. It will be appreciated, however, that the present invention can be located in a variety of desired positions, including various angles, sideways and even upside down. A detailed description of the systems and methods for automatic spotting and safety indicator deployment now follows.

Safety indicators are becoming increasingly common in many industries; for example, ego-machines, aviation, computing devices, smart home technology, water recreational activities, snow sports, Internet of Things (IoT) devices and systems, and other systems, processes, operations, and/or activities where safety may be considered. As used in the present disclosure, "safety indicator" may refer to one or more signals, symbols, beacons, or any other indicators that may signal and/or otherwise indicate some information related to safety. For example, safety indicators may include flags, blinking lights, lights of a certain color, video feed, sounds, haptic feedback, and any other indicator conveying information and that information may be related to safety. Additionally, or alternatively, safety indicators may include one or more operations and/or actions that may be performed by one or more systems, machines, devices, etc. to mitigate one or more safety risks—e.g., stopping operations of a machine, causing a machine to turn in a given direction, increasing or decreasing a speed corresponding to a vehicle, etc.

In some instances, the one or more safety indicators may be defined by one or more laws, safety regulations, rules, etc. The one or more safety indicators may, for example, correspond to the use of one or more systems, devices, machines, etc. Further, safety indicators may be used during and/or to participate in one or more activities, games, sports, recreational activities, physical endeavors, and the like.

For example, in the context of water sports, e.g., water skiing, wakeboarding, etc., it may be desired and/or required to signal to other boats on the water when an individual may be in the water, such as while not being towed (e.g., after having fallen in the water, prior to being pulled up to a starting position, etc.). The signal may be dictated and/or defined by a relevant jurisdiction, for example, the regulation indicating deployment of a safety indicator in Utah for boating activities may be defined by Utah Administrative Code R651-224-3. Continuing the example, the signal may be indicated using an orange flag that may be manually raised by one or more individuals that may be present on the boat. In some instances, the safety indicator may indicate to other drivers and individuals on other boats to exercise more caution to look out for individuals that may be in the water nearby. Further, the safety indicator may prevent and/or mitigate accidents—e.g., boats driving over or hitting individuals in the water.

In some instances, one or more safety indicators may be deployed upon encountering one or more safety triggers. As used in the present disclosure, a "safety trigger" may refer to a change to one or more objects, persons, data (e.g., pressure changes, speed changes, etc.), and any other characteristic corresponding to an environment that may adversely affect safety. In some embodiments, for example, the one or more characteristics associated with an environment may be determined to adversely affect safety based on one or more safety regulations imposed by one or more regulatory bodies, one or more industry standards corresponding to one or more systems associated with the environment. Further, the one or more characteristics associated with an environment may be determined to adversely affect safety based on one or more determinations that the one or more characteristics associated with the environment may increase one or more risks of harm beyond a predetermined threshold.

In some instances, one or more safety indicators may be deployed manually in response to one or more safety triggers corresponding to an environment. In some instances, safety indicators deployed manually may present one or more challenges. One challenge may include a lack of personnel who may be able to assist in deploying the safety indicator. For example, in the context of signaling that an individual may be in the water, there may only be a driver in the boat who may be towing one or more individuals behind the boat. Further, because the driver may have one or more other duties such as, steering the boat, managing speed, etc., the driver may not deploy the safety indicator in enough time for the safety indicator to be effective. Additionally or alternatively, the driver may forget and/or neglect to deploy the safety indicator, thereby increasing the risk of harm to the individual in the water.

An additional challenge may be that one or more individuals who may be tasked with manually deploying the safety indicator may do so in a nonchalant, non-visible, or discrete manner that may decrease the efficacy of the safety indicator. For example, in the context of a boating activity where an orange flag may be raised to indicate an individual is in the water, an individual may be tasked with raising the orange flag. The individual tasked with raising the orange flag may do so in such a way that other boats may not be able to see the orange flag resulting in an increase in risk to the individual in the water and a decrease in the effectiveness of the orange flag to communicate the potential risk to other boats.

Additionally or alternatively, continuing the example of the safety indicator as an orange flag, an individual tasked with deploying the safety indicator may do so correctly. However, the safety indicator may still be hidden behind umbrellas, Bimini tops, and/or one or more other portions of the boat or other structures such that others may be unable to see the safety indicator despite the deployment of the orange flag. Deploying the safety indicator in this manner may decrease the efficacy of the safety indicator and put the individuals in the water at an increased risk of injury.

One or more exemplary embodiments may increase the efficacy and/or consistency of deploying safety indicators as compared to, for example, safety indicators that may be deployed manually. Further, exemplary embodiments may correspondingly decrease an amount of risk to individuals, property, etc. corresponding to the safety indicator in response to a safety indicator being consistently, automatically deployed.

In some exemplary embodiments, to automatically deploy one or more safety indicators, one or more systems may be configured to obtain data and/or information corresponding to an environment. Further, the system may be configured to use the input data to automatically detect one or more safety triggers. In some exemplary embodiments, the presence or absence of a safety trigger may result in one or more safety indicators being deployed.

Further, in some exemplary embodiments, a machine learning model, in conjunction with one or more perception operations and/or systems may be trained to determine whether one or more safety triggers exist in an amount of input data. In some exemplary embodiments, in response to determining whether the safety trigger may be present in the environment, the machine learning model and/or one or more corresponding systems may perform one or more operations and/or cause one or more operations to be performed. In some exemplary embodiments, the one or more operations may deploy or cause the deployment of one or more safety indicators.

According to one or more exemplary embodiments, automatically determining one or more safety triggers corresponding to input data may improve the consistency and accuracy of detecting the one or more safety triggers in the environment. Further, the automatic detection of one or more safety triggers may additionally increase the accuracy and/or consistency in deploying one or more corresponding safety indicators. In some exemplary embodiments, automatically deploying one or more safety indicators may eliminate the challenge of an inadequate number of individuals for proper deployment of safety indicators. Furthermore, the safety indicators may be deployed consistently and in a way that may improve the effectiveness and decrease the amount of variability inherent in manual deployment of safety indicators.

Turning to the figures, FIG. 1 illustrates an example environment 100 for automatically deploying a safety indicator 110. In some exemplary embodiments, the environment 100 may include a spotting system 104 that may determine and/or generate one or more control commands 106 based on the input data 102.

The environment 100 may correspond to one or more different applications including, for example, boating, water sports, field sports, autonomous vehicles, semi-autonomous vehicles, aviation, drones, industrial robotics, smart home automation, and any other application where one or more safety indicators 110 may be deployed based on the presence of one or more safety triggers 108 corresponding to the environment 100.

In some exemplary embodiments, the spotting system 104 may include one or more systems, machines, devices, integrated systems, processes, machine learning models, etc. that may be configured to determine whether one or more safety triggers 108 may be included in the input data 102. In some exemplary embodiments, the spotting system 104 may be included in one or more other systems where one or more safety indicators may be deployed. For example, in the context of the spotting system 104 used for boating, the spotting system 104 may be included in one or more subsystems associated with the boat—e.g., navigation subsystems, entertainment subsystems, and the like.

In some exemplary embodiments, the spotting system 104 may be configured to receive and/or otherwise obtain the input data 102. In some embodiments, the input data 102 may include data and/or information corresponding to the environment 100 that may be collected in real-time or in substantially real-time.

In some exemplary embodiments, the input data 102 may include sensor data associated with the environment 100. In some exemplary embodiments, the input data 102 may be generated using one or more corresponding sensors—e.g., one or more image sensors, light detection and ranging (LiDAR) sensors, radio detection and ranging (RADAR) sensors, pressure sensors, tension sensors accelerometers, motion sensors, proximity sensors, and other sensors that may be configured to generate sensor data corresponding to the particular environment. In some exemplary embodiments, the one or more sensors may be included in the spotting system 104.

Additionally or alternatively, the one or more sensors may be included in one or more other systems separate from the spotting system 104 where sensor data corresponding to the environment 100 may be generated. For example, in the context of the one or more sensors as an image sensor, image data corresponding to the environment 100 may be generated using the image sensor. Continuing the example, the image sensor may correspond to one or more other systems, machines, devices, etc. (e.g., a camera, mobile phone, etc.) separate and apart from the spotting system 104. Further continuing the example, the resulting image data may be included in the input data 102 and may be received and/or otherwise obtained by the spotting system 104.

In some exemplary embodiments, the input data 102 may include data and/or information that may include one or more different data types. For example, the data may include integers, floats, longs, chars, strings, Booleans, and any other data type that may convey information corresponding to the environment 100. In some embodiments, the input data 102 may be sent to, generated by, received, and/or obtained by the spotting system 104.

In some exemplary embodiments, the input data 102 may include one or more safety triggers 108. In some exemplary embodiments, the input data 102 may indicate that one or more safety triggers 108 may be present in a particular environment—e.g., the environment 100. In some embodiments, the one or more safety triggers 108 may be determined based on one or more safety regulations imposed by one or more regulatory bodies, one or more industry standards corresponding to the spotting system 104 and/or other associated systems, and/or one or more determinations that the one or more characteristics associated with the environment may increase one or more risks of harm beyond a predetermined threshold.

In some exemplary embodiments, the one or more safety triggers 108 may be designated as a safety trigger 108 based on one or more safety regulations. For example, one or more rules may be implemented by the National Highway Traffic Safety Administration (NHTSA) may implement one or more rules and/or regulations requiring the use of back-up cameras on new vehicles when the vehicle is in reverse. In response to the rule and/or regulation, putting a vehicle in reverse may be considered to adversely affect safety and thereby may be considered an example safety trigger 108.

Additionally or alternatively, the one or more safety triggers 108 may be designated as such in response to the one or more safety triggers 108 increasing one or more risks of harm beyond a predetermined threshold. In some exemplary embodiments, the risk of harm may include risks of economic loss. For example, the spotting system 104 and/or other systems corresponding to the spotting system 104 may perform one or more operations that may cause damage to the spotting system 104 and/or a corresponding system. In some exemplary embodiments, the damage caused may result in economic loss to one or more owners of the spotting system 104 and/or one or more other corresponding systems.

In some exemplary embodiments, the risk of harm may include risks of property damage and/or economic loss outside of the spotting system 104 and/or systems corresponding to the spotting system 104. In some exemplary embodiments, one or more characteristics corresponding to the environment may result in damage to property and/or result in an increase to a risk of damage to property. In some exemplary embodiments, the one or more characteristics corresponding to the environment may increase a risk of damage to property that may not be associated with the spotting system 104 and/or one or more corresponding systems.

In some exemplary embodiments, the risk of harm may include risks of bodily harm and/or injury to an individual. For example, in the context of the spotting system 104 corresponding to a boat, the spotting system 104 may detect one or more individuals in the water not being towed. Continuing the example, the risk to the individual may increase beyond a threshold and, as a result, the individual in the water may be determined to be a safety trigger 108 corresponding to the environment.

In some exemplary embodiments, the safety triggers 108 may be indicated by one or more changes in the input data 102. For example, in the context of the environment 100 including one or more water sports, the input data 102 may include image data that may include images monitoring an area in the water behind a boat. Continuing the example, the image data may include one or more individuals that may be, for example, water skiing or wakeboarding behind the boat. At a first time stamp, an individual may be present and/or upright in the image data, and at a second time stamp, the individual may be show in the water or absent from the image data at a second time stamp. The individual being absent from the image data may be a safety trigger 108 that may be included in the input data 102.

In some exemplary embodiments, the one or more control commands 106 that may be determined and/or generated by the spotting system 104 may be configured to cause one or more operations to be performed. In some exemplary embodiments, the one or more control commands 106 may cause the spotting system 104 to perform one or more operations. Additionally or alternatively, the one or more control commands 106 may be configured to cause one or more other systems, devices, machines, etc. to perform one or more operations. For example, in the context of the spotting system 104 included on a boat, the one or more control commands 106 may be configured to cause the boat to perform one or more operations (e.g., accelerate, decelerate, turn, shut off engine, raise a flag, generate one or more sounds, blinking lights, etc.).

In some exemplary embodiments, the one or more control commands 106 may include deploying one or more safety indicators 110. In some exemplary embodiments, the one or more safety indicators 110 may include one or more signals that may relate to safety. In some exemplary embodiments, the one or more safety indicators 110 may be deployed based on determining and/or detecting the presence of one or more safety triggers 108 corresponding to the environment.

In some exemplary embodiments, the spotting system 104 may be configured to generate one or more control commands 106 that may cause one or more operations to be performed that may deploy one or more safety indicators 110 based on the input data 102 and/or on one or more safety triggers 108. In some exemplary embodiments, the spotting system 104 may be configured to determine whether one or more safety triggers 108 may be included in the input data 102. Additionally or alternatively, the spotting system 104 may be configured to determine whether to generate one or more control commands 106 that may be configured to deploy one or more safety indicators 110 based on whether the one or more safety triggers 108 may be included in the input data 102.

In some exemplary embodiments, the spotting system 104 may be configured to identify and/or determine whether one or more safety triggers 108 may be included in the input data 102. For example, in the context of the spotting system 104 including in, or corresponding to, one or more boats, the spotting system 104 may be configured to receive data and/or information generated using one or more tension sensors. Further, the tension sensors may indicate tension in a tow rope behind the boat that may be connected to one or more individuals that may be participating in one or more water sports (e.g., water skiing, wake boarding, wake surfing, tubing, etc.). The lack of tension in the tow rope may indicate that one or more of the individuals being towed behind the boat may have fallen into the water and may therefore be identified as one or more safety triggers 108. Continuing the example, the spotting system 104 may be configured to determine and/or identify the lack of tension in the rope as a safety trigger 108.

In some exemplary embodiments, the spotting system 104 may be configured to determine and/or generate one or more control commands 106 based on the determination as to whether one or more safety triggers 108 may be included in the input data 102. For example, continuing in the context of the tension sensors indicating an amount of tension in a tow rope, in response to the tension in the tow rope decreasing beyond a particular threshold, the spotting system 104 may generate one or more control commands 106 that may cause a safety indicator 110 to deploy—e.g., an orange flag indicating that one or more individuals may be in the water, a flashing light on top of the boat, a horn corresponding to the boat sounding, etc.

As an additional example of the spotting system 104, continuing in the context of the spotting system 104 on one or more boating subsystems, the spotting system 104 may be configured to obtain input data 102 including data and/or information generated using a proximity sensor. For example, the proximity sensor may be configured to detect one or more individuals being towed behind the boat. Further, the spotting system 104 may be configured to determine whether a safety trigger 108 may be present which may be whether the individual has fallen in the water and/or is no longer being towed behind the boat. Continuing the example, in response to determining that a safety trigger 108 may be indicated by the sensor data (e.g., that the individual is beyond a threshold distance from the back of the boat), the spotting system 104 may be configured to determine and/or generate one or more control commands 106 that may cause one or more safety indicators 110 to deploy (e.g., raising an orange flag, flashing a light on top of the boat, decreasing the speed of the boat, etc.).

Modifications, additions, or omissions may be made to FIG. 1 without departing from the scope of the present disclosure. For example, the amount of input data 102 and/or the types of input data 102 may vary. Further, the number of safety triggers 108 corresponding to the input data 102 may vary. As an additionally example, the number of spotting systems 104 may vary, the number of control commands 106 may vary. The specifics given and discussed are to help provide explanation and understanding of concepts of the present disclosure and are not meant to be limiting.

Figure 2:
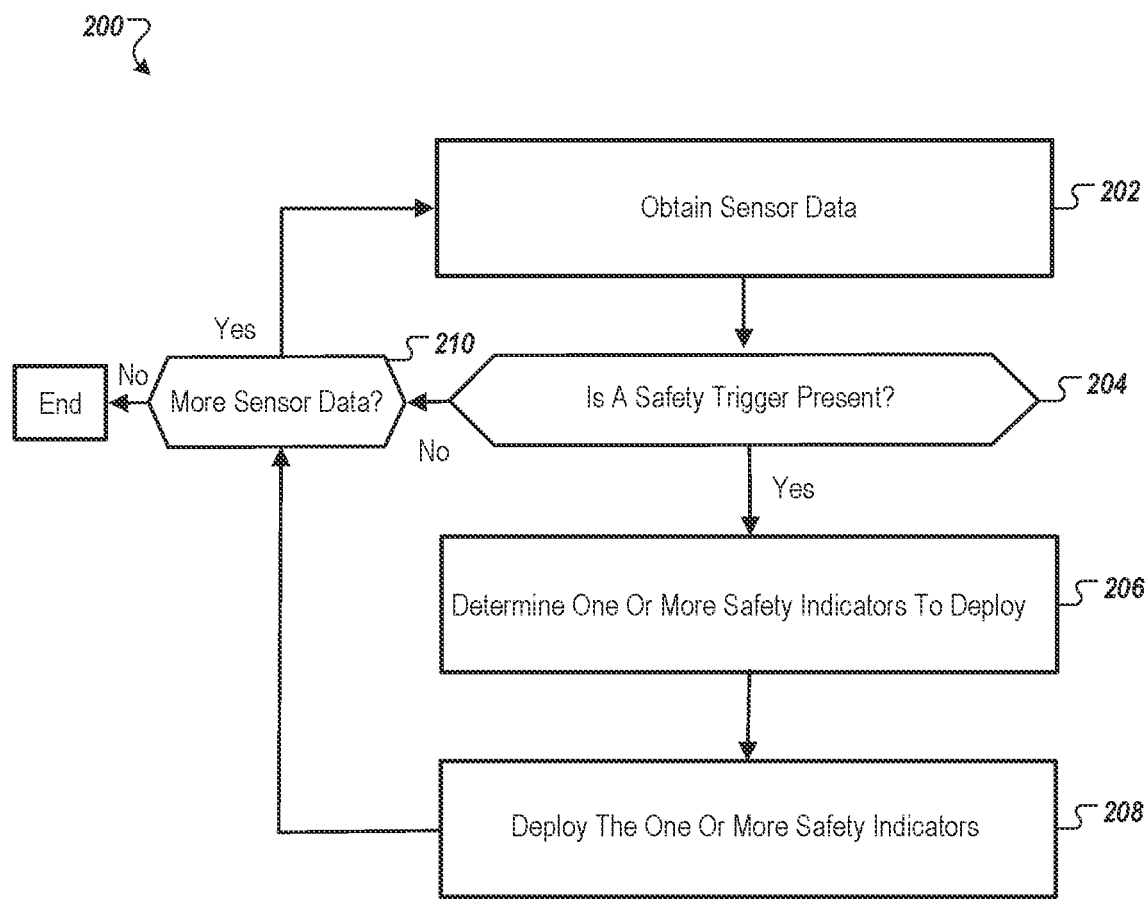
FIG. 2 illustrates a flow chart of an example method of detecting a safety trigger and deploying a safety indicator.

FIG. 2 illustrates a flow chart of an example method 200 of detecting a safety trigger and deploying a safety indicator, in accordance with one or more embodiments of the present disclosure. One or more operations of the method 200 may be performed by any suitable system, apparatus, or device such as, for example the spotting system 104 described and/or illustrated with respect to FIG. 1, the spotting system 304, detection subsystem 310, output subsystem 320, perception module 312, machine learning model 314, and/or control module 316 described and/or illustrated with respect to FIG. 3, and/or the computing device(s) described with respect to FIG. 6, in the present disclosure.

The method 200 may include one or more blocks 202, 204, 206, 208, and 210. Although illustrated with discrete blocks, the operations associated with one or more of the blocks of the method 200 may be divided into additional blocks, combined into fewer blocks, or eliminated, depending on the particular implementation.

In some exemplary embodiments, the method 200 may include block 202, at block 202 sensor data may be obtained. In some exemplary embodiments, the sensor data may be an example of the input data 102 described and/or illustrated further in the present disclosure, such as, for example, with respect to FIG. 1. In some exemplary embodiments, the sensor data may include data and/or information corresponding to the environment and/or one or more characteristics corresponding to the environment.

At block 204, it may be determined whether a safety trigger may be present in the environment. In some exemplary embodiments, the safety trigger may be the same as and/or analogous to the one or more safety triggers 108 described and/or illustrated further in the present disclosure, such as, for example, with respect to FIG. 1. In some exemplary embodiments, it may be determined that a safety trigger may not be present in the environment based on the sensor data that may have been obtained. In some exemplary embodiments, in response to the safety trigger not being present in the sensor data, the method and/or process 200 may proceed to block 210. In response to one or more safety triggers being present in the sensor data, the method and/or process 200 may proceed to block 206.

At block 206, in response to a safety trigger being present, it may be determined which safety indicators to deploy. In some exemplary embodiments, the safety indicators may be the same as and/or analogous to the safety indicators 108 described and/or illustrated further in the present disclosure, such as, for example, with respect to FIG. 1.

In some exemplary embodiments, one or more determinations may be made as to which of the one or more safety indicators to deploy. In some exemplary embodiments, the one or more determinations may be made using one or more spotting systems—e.g., the spotting system 104 described with respect to FIG. 1. In some exemplary embodiments, the one or more determinations may be made using the sensor data that may be obtained, for example, by the one or more spotting systems. For example, one or more safety indicators may be deployed based on a location corresponding to the one or more safety triggers that may be present in the environment.

For example, in the context of the one or more spotting systems corresponding to a boat, one or more cameras or other image sensors may show and/or view an area surrounding the boat. One safety trigger corresponding to a boating environment may be one or more individuals falling and/or jumping off of the boat or otherwise being in the water without being towed. Continuing the example, the one or more image sensors may show and/or indicate an individual falling off of the front of the boat which may be a safety trigger and, in response to the safety trigger, the one or more spotting systems may determine that a safety indicator to deploy may be to raise an orange flag, shut off the engine, shut off the propeller, begin to turn the boat, begin sounding a horn, and/or one or more other safety indicators that may be deployed in response to an individual jumping off the front of the boat. In contrast, the one or more cameras and/or image sensors may indicate that an individual may be in the water behind the boat (e.g., falling off the back of the boat, falling off of a wake board being towed behind the boat, etc.). In response to the safety trigger being located behind the boat, one or more other safety indicators may be deployed, for example, raising an orange flag, beginning to turn the boat around, providing video feed corresponding to the area behind the boat to a driver of the boat, etc.

At block 208, one or more safety indicators may be deployed. In some exemplary embodiments, the one or more safety indicators may be deployed based on the determination of which safety indicators to deploy that may be made, for example, at block 206. In some exemplary embodiments, the one or more safety indicators may be deployed using one or more control commands—e.g., the one or more control commands 106 described further in the present disclosure, such as, for example, with respect to FIG. 1.

At block 210, a determination may be made as to whether more sensor data may exist. In some exemplary embodiments, in response to determining that more sensor data may exist corresponding to the environment, the method and/or process 200 may continue at block 202 where sensor data may be obtained. In response to determining that more sensor data may not exist, the method and/or process 200 may end.

Modifications, additions, or omissions may be made to one or more operations included in the method 200 without departing from the scope of the present disclosure. For example, the operations of method 200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 3:
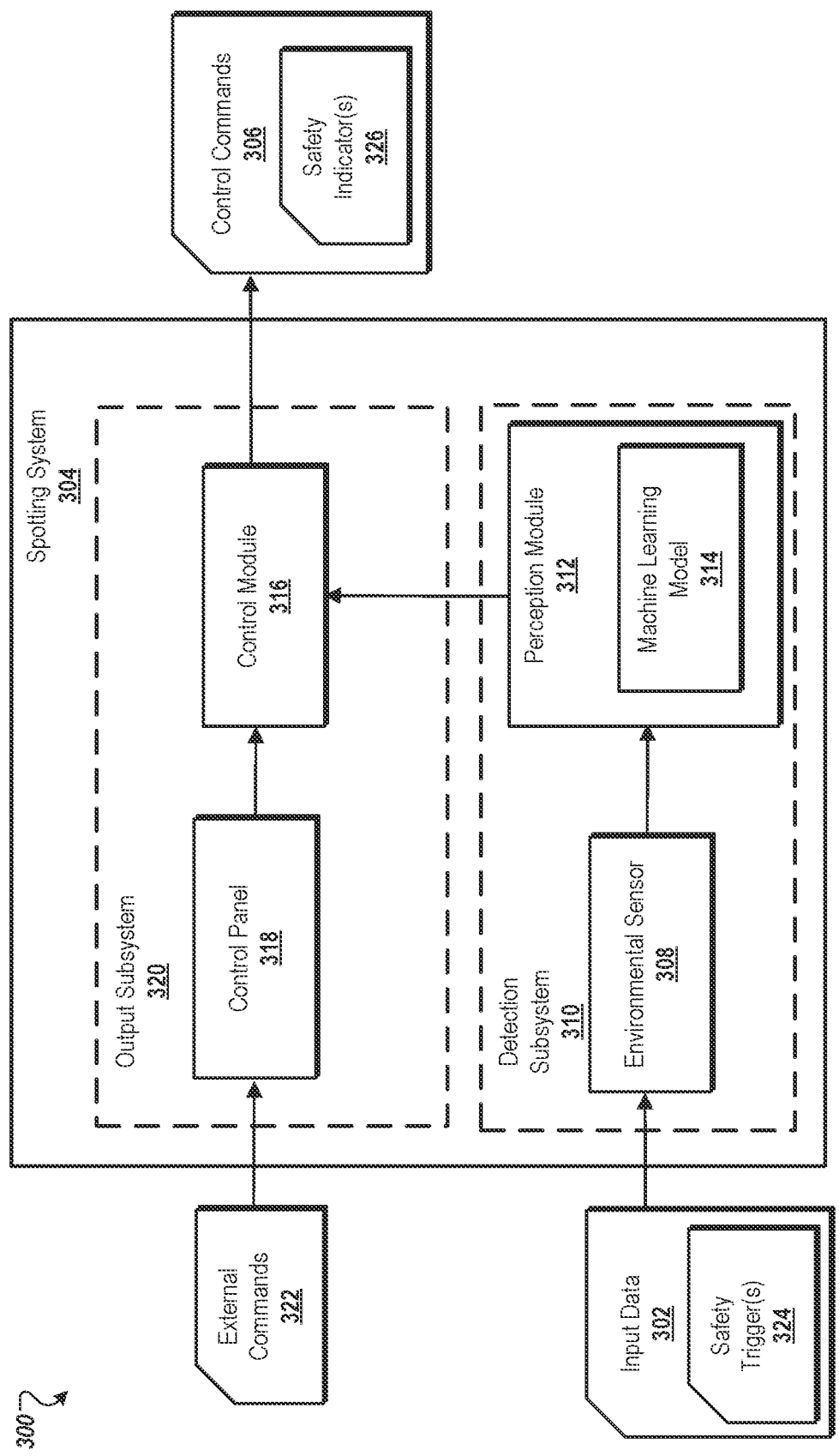
FIG. 3 illustrates an example spotting system configured to generate one or more control commands based on input data.

FIG. 3 illustrates an exemplary environment 300 including a spotting system 304 which may be configured to generate one or more control commands 306 based on input data 302, in accordance with one or more exemplary embodiments. In some exemplary embodiments, the environment 300 may be the same as and/or analogous to the environment 100 described and/or illustrated further in the present disclosure, such as, for example, with respect to FIG. 1. Further, the environment 300 may include one or more systems and/or processes that may perform one or more portions of the method 200 described and/or illustrated in FIG. 2.

In some exemplary embodiments, the spotting system 304 may include one or more modules including, for example, the perception module 312, machine learning model 314, and/or a control module 316. In some exemplary embodiments, the perception module 312, the machine learning model 314, and/or the control module 316 may be implemented using hardware including one or more processors, central processing units (CPUs) graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators (DLAs)), and/or other processor types. In some other instances, one or more of the modules, such as the perception module 312, the machine learning model 314, and/or the control module 316, may be implemented using a combination of hardware and software. In the present disclosure, operations described as being performed by a respective module may include operations that the respective module may direct a corresponding computing system to perform. In these or other embodiments, one or more of the perception modules 312, the machine learning models 314, and/or the control modules 316 may be implemented by one or more computing devices, such as that described in further detail with respect to FIG. 6.

In some exemplary embodiments, the spotting system 304 may include a detection subsystem 310 configured to detect and/or determine one or more safety triggers 324 based on the input data 302. Further, in some exemplary embodiments, the spotting system 304 may include an output subsystem 320 that may be configured to generate one or more control commands 306 based on the detection and/or determination made using the detection subsystem 310. In some exemplary embodiments, the spotting system 304 may be an example of the spotting system 104 described further, such as, for example, with respect to FIG. 1.

In some exemplary embodiments, the detection subsystem 310 may include one or more systems and/or subsystems that may be a part of the spotting system 304. In some exemplary embodiments, the detection subsystem 310 may be included in one or more other systems separate and apart from the spotting system 304 and that may be directed by the spotting system 304. In some exemplary embodiments, the spotting system 304 may be configured to direct one or more separate systems to collect input data (e.g., input data 302) that may correspond to a particular environment. Further continuing the example, the spotting system 304 may direct the detection subsystem 310 to parse through input data 302 and detect and/or determine whether one or more safety triggers (e.g., the one or more safety triggers 108) may be present and/or included in the particular environment.

In some exemplary embodiments, the detection subsystem 310 may be configured to receive and/or obtain input data 302. In some exemplary embodiments, the detection subsystem 310 may be configured to direct one or more sensors to collect and/or generate sensor data corresponding to the particular environment. In some exemplary embodiments, the detection subsystem 310 may include one or more sensors that may be configured to generate and/or collect sensor data corresponding to the particular environment. Additionally or alternatively, the detection subsystem 310 may be configured to receive and/or otherwise obtain input data 302 corresponding to the particular environment, where the input data 302 may be collected using one or more other systems.

In some exemplary embodiments, the input data 302 may include sensor data, historical data, and any other forms of data that may correspond to a particular environment. In some exemplary embodiments, the input data 302 may be the same as and/or analogous to the input data 102 described further in the present disclosure, such as, for example, with respect to FIG. 1. In some exemplary embodiments, the input data 302 may be generated using the environmental sensor 308.

In some exemplary embodiments, the input data 302 may include data and/or information that may indicate one or more safety triggers 324. In some exemplary embodiments, the one or more safety triggers 324 may be the same as and/or analogous to the one or more safety triggers 108 described and/or illustrated further, such as, for example, with respect to FIG. 1.

In some exemplary embodiments, the environmental sensor 308 may include one or more sensors that may be configured to generate sensor data that may indicate one or more characteristics corresponding to a particular environment. In some exemplary embodiments, for example, the environmental sensor 308 may include one or more temperature sensors, light sensors, pressure sensors, tension sensors, proximity sensors, motion sensors, accelerometers, gyroscopes, infrared sensors, pH sensors, radiation sensors, and any other sensors that may generate data corresponding to one or more characteristics corresponding to the environment.

For example, the environmental sensor 308 may include one or more image sensors that may be configured to generate sensor data including one or more images that may correspond to a particular portion of the environment that may be monitored using the detection subsystem 310 and/or the spotting system 304. Continuing the example, the image data may include one or more frames of pixels that may be collected and/or generated over time where the image data may include one or more frames of pixels that may illustrate the particular portions of the environment. Further, the one or more image sensors may be configured to generate sensor data to monitor the environment and/or portions of the environment during a particular time.

In some exemplary embodiments, the environmental sensor 308 may correspond to one or more other machines, devices, systems, etc., where the one or more other machines, devices, systems, etc. may be separate and apart from the spotting system 304. For example, one or more image sensors may correspond to one or more mobile devices, where the one or more image sensors may be collecting data corresponding to a particular environment. Continuing the example, the image data that may be collected using the one or more mobile devices may be sent to the detection subsystem 310 and/or the spotting system 304 using the one or more mobile devices. Further, the detection subsystem 310 and/or spotting system 304 may be configured to receive and/or obtain the sensor data generated using the one or more mobile devices.

In some exemplary embodiments, the input data 302, including data collected, received, obtained, and/or generated using the environmental sensor 308 may be used to determine whether one or more safety triggers 324 may be present within the particular environment. In some exemplary embodiments, the perception module 312 and/or one or more machine learning models 314 may be configured to detect a presence or an absence of one or more safety triggers 324 corresponding to the environment.

In some exemplary embodiments, the perception module 312 may include one or more modules, systems, subsystems, etc. that may be configured to detect one or more safety triggers 324 associated with the environment. In some exemplary embodiments, the one or more systems, subsystems, etc. may include one or more processors, CPUs, and/or other computing systems that may be configured to determine and/or detect one or more safety triggers 324 may be indicated using the input data 302. In some exemplary embodiments, the perception module 312 may include one or more machine learning models 314 that may be configured to determine and/or detect whether one or more safety triggers 324 may be present in the environment 300.

In some exemplary embodiments, the one or more machine learning models 314 may include a support vector machine (SVM), a generative adversarial network (GAN), generative stochastic networks (GSN), generative moment matching networks (GMMN), deep convolutional adversarial networks (DCGAN), Wasserstein GAN (WGAN), diffusion machine learning models, transformer machine learning models, a supervised model, an unsupervised model, a semi-supervised model, artificial neural networks, convolutional neural networks, deep learning neural networks, and/or other machine learning models, systems, and/or neural networks that may be configured to classify one or more characteristics corresponding to data associated with the particular environment. In some exemplary embodiments, the one or more machine learning models 314, in conjunction with the perception module 312, may be configured to determine and/or detect whether one or more safety triggers 324 may be indicated using the input data 302.

In some exemplary embodiments, the one or more machine learning models 314 may be trained using one or more training datasets that may include training data. In some exemplary embodiments, the training data included in the one or more training datasets may include data including one or more of the same characteristics corresponding to the input data 302. For example, the input data 302 may include image data corresponding to the environment 300. Continuing the example, the one or more machine learning models 314 may correspondingly be trained using image data included in one or more training datasets. Further continuing the example, the training data may include image data of a certain size, pixel count, images divided into particular subsections, data that may be in color, data that may be in grayscale, and one or more other characteristics that may structure the data included in the one or more training datasets.

In some exemplary embodiments, the training data included in the one or more training datasets may include data and/or information that may correspond to the environment 300. For example, in the context of the environment 300 including a boat and an area surrounding the boat, the training data may include data and/or information corresponding to one or more watersports (e.g., wakeboarding, wake surfing, water skiing, tubing, etc.). Further, the training data may be configured to train the one or more machine learning models 314 to identify one or more safety triggers 324 that may correspond to the boat, watersports, towing individuals and/or gear behind the boat, etc. Continuing the example, the training data may include individuals upright being towed behind the boat, one or more individuals falling in the water, one or more individuals in the water after having fallen, and/or one or more individuals not appearing in the training data, etc. In some exemplary embodiments, the training data may be configured to train the one or more machine learning models 314 to recognize, detect, and/or determine one or more characteristics in the input data 302 corresponding to the environment 300.

In some exemplary embodiments, one or more pre-processing operations may be performed using the input data 302. In some exemplary embodiments, the one or more pre-processing operations may be performed in such a way that the perception module 312 and/or the one or more machine learning models 314 may be configured to detect whether one or more safety triggers 324 may be present in the environment 300. For example, the input data 302 may be cleaned, filtered, transformed, and/or otherwise modified such that the one or more machine learning models 314 may use the input data 302 to detect one or more safety triggers 324.

For example, in the context of the input data 302 as image data, the input data 302 may include one or more images that may include pixel data corresponding to the environment 300 at one or more time stamps. Continuing the example, the image may be modified to conform with the training data that may have been used to train the one or more machine learning models 314. The modifications to the data may include resizing the image data to include a particular size, converting the image data from color images to gray scale, etc.

As an additional example, in the context of the input data 302 as image data, the input data 302 may include one or more images, the preprocessing operations may include normalizing pixels corresponding to the one or more images. For example, normalizing an 8-bit image may include dividing the pixel count by 255, dividing a 12-bit image by 4,095, dividing a 16-bit image by 65,535, etc. Continuing the example, the one or more images that may have been normalized may be configured to be passed through one or more machine learning systems, neural networks, etc.

In some exemplary embodiments, the perception module 312 may be configured to determine whether one or more safety triggers 324 exist in the particular environment based on the input data 302 changing, for example, above or below a particular threshold. In some exemplary embodiments, the particular threshold may be based on one or more safety triggers 324 that may be indicated in the particular environment and the input data 302 that may be used to indicate one or more characteristics corresponding to the particular environment.

For example, in the context of detecting and/or determining one or more safety triggers 324 corresponding to an environment surrounding a boat, the detection subsystem 310 may be configured to direct one or more radar sensors to collect data corresponding to an area behind the boat. Further, the one or more RADAR sensors may be configured to determine that one or more objects, individuals, etc. may be towed behind the boat. Continuing the example, the perception module 312 may be configured to detect a change in RADAR sensor data that may indicate that the object and/or individual being towed, may have fallen, or otherwise may no longer be towed behind the boat. The perception module 312 may be configured to detect a change in RADAR data where RADAR detections corresponding to one or more objects may fall beneath a threshold, indicating, for example, that one or more individuals may have fallen into the water. In response to the RADAR data falling below a threshold may indicate one or more safety triggers 324 that may be detected and/or determined using the perception module 312.

In some exemplary embodiments, the threshold may be determined using one or more heuristic analyses. In some exemplary embodiments, it may be determined that, for example, radar data corresponding to one or more radar detection points falling beyond a certain percentage—e.g., 10, 20, 30, 40, or some other percent, may correspond to an accurate indication that the one or more objects may no longer be present in the environment.

In some exemplary embodiments, the perception module 312 and/or the one or more machine learning models 314 may be configured to detect one or more safety triggers 324 corresponding to the environment 300. In some exemplary embodiments, the determination of the presence or absence of the one or more safety triggers 324 may be sent to one or more other systems and/or modules, such as, for example, the control module 316 and/or the output subsystem 320.

In some exemplary embodiments, the output subsystem 320 may include one or more systems and/or subsystems that may be a part of the spotting system 304. In some exemplary embodiments, the output subsystem 320 may be included in one or more other systems separate and apart from the spotting system 304 and that may be directed by the spotting system 304. For example, the spotting system 304 may be configured to direct one or more separate systems to determine one or more control commands 306 and/or safety indicators 326 to deploy. Further continuing the example, the spotting system 304 may direct the output subsystem 320 to determine one or more control commands 306 and/or deploy one or more safety indicators 326 in response to the detection and/or determination that one or more safety triggers 324 may be present in the environment 300. In some exemplary embodiments, the output subsystem 320 may include one or more of a control module 316 and/or a control panel 318.

In some exemplary embodiments, the control module 316 may include one or more systems, subsystem, modules, virtual machines, etc. that may be configured to determine one or more control commands 306. For example, the control module 316 may include, be included in, and/or direct one or more operations corresponding to one or more microcontrollers (e.g., an STM32 microcontroller) that may be used, for example, in combination with a universal asynchronous receiver/transmitter (UART) to receive data and/or information that one or more safety triggers 324 may be present in the environment 300.

In some exemplary embodiments, the control module 316 may be configured to determine and/or cause one or more control commands 306 to be performed. In some exemplary embodiments, the control module 316 may be configured to determine one or more control commands 306 based on the input data 302, a presence of one or more safety triggers 324, and/or what safety triggers 324 may be present in the environment 300.

In some exemplary embodiments, the control panel 318 may include a user interface, for example, one or more buttons, touch screens, or other interfaces. In some embodiments, the control panel 318 may be configured to allow one or more external users of the spotting system 304 to provide one or more external commands 322 that may be responded to by the spotting system 304.

In some exemplary embodiments, the one or more external commands 322 may include buttons, touch screen options, electrical signals, and/or other communications that may convey information to the spotting system 304 from one or more external users and/or systems. For example, the one or more external commands 322 may include on/off switches, pause options, toggle options, confirmation options, etc. In some embodiments, the one or more external commands 322 may influence and/or indicate one or more operations that may be performed by the spotting system 304.

In some exemplary embodiments, the one or more control commands 306 may cause one or more systems to perform one or more operations. In some exemplary embodiments, the one or more control commands 306 may cause the spotting system 304 to perform one or more operations. Additionally or alternatively, the one or more control commands 306 may cause one or more other systems to perform one or more operations. For example, in response to a determination that no safety triggers 324 may be present in the environment 300, the one or more control commands 306 may cause the spotting system 304 to generate, collect, and/or otherwise obtain more input data 302 corresponding to the environment 300 to, for example, continue to monitor the environment 300.

In some exemplary embodiments, the one or more control commands 306 may include direction to deploy one or more safety indicators 326. In some exemplary embodiments, the one or more safety indicators 326 may be the same as and/or analogous to the safety indicators 110 described and/or illustrated further in the present disclosure, such as, for example, with respect to FIG. 1. For example, in the context of the environment 300 including an area behind a boat towing one or more individuals in water sports, it may be determined that one or more safety triggers 324 may exist (e.g., one or more individuals may have fallen in the water, one or more objects may have fallen in the water, one or more unknown or foreign objects may be detected in the area, etc.). In response to a determination that one or more safety triggers 324 may be in the environment 300, the one or more control commands 306 may cause and/or otherwise direct deployment of one or more safety indicators 326—e.g., automatically raising an orange flag, shutting off the engine and/or propeller, shining one or more lights, sounding a horn or other sound, etc.

Modifications, additions, or omissions may be made to FIG. 3 without departing from the scope of the present disclosure. For example, the amount of input data 302 and/or the types of input data 302 may vary. Further, the number of safety triggers 324 corresponding to the input data 302 may vary. As an additionally example, the number of spotting systems 304 may vary, the number of control commands 306 may vary. Further, the number of systems that may be directed and/or controlled using the spotting system 304, the output subsystem 320, the detection subsystem 310 may vary. The specifics given and discussed are to help provide explanation and understanding of concepts of the present disclosure and are not meant to be limiting.

Figure 4:
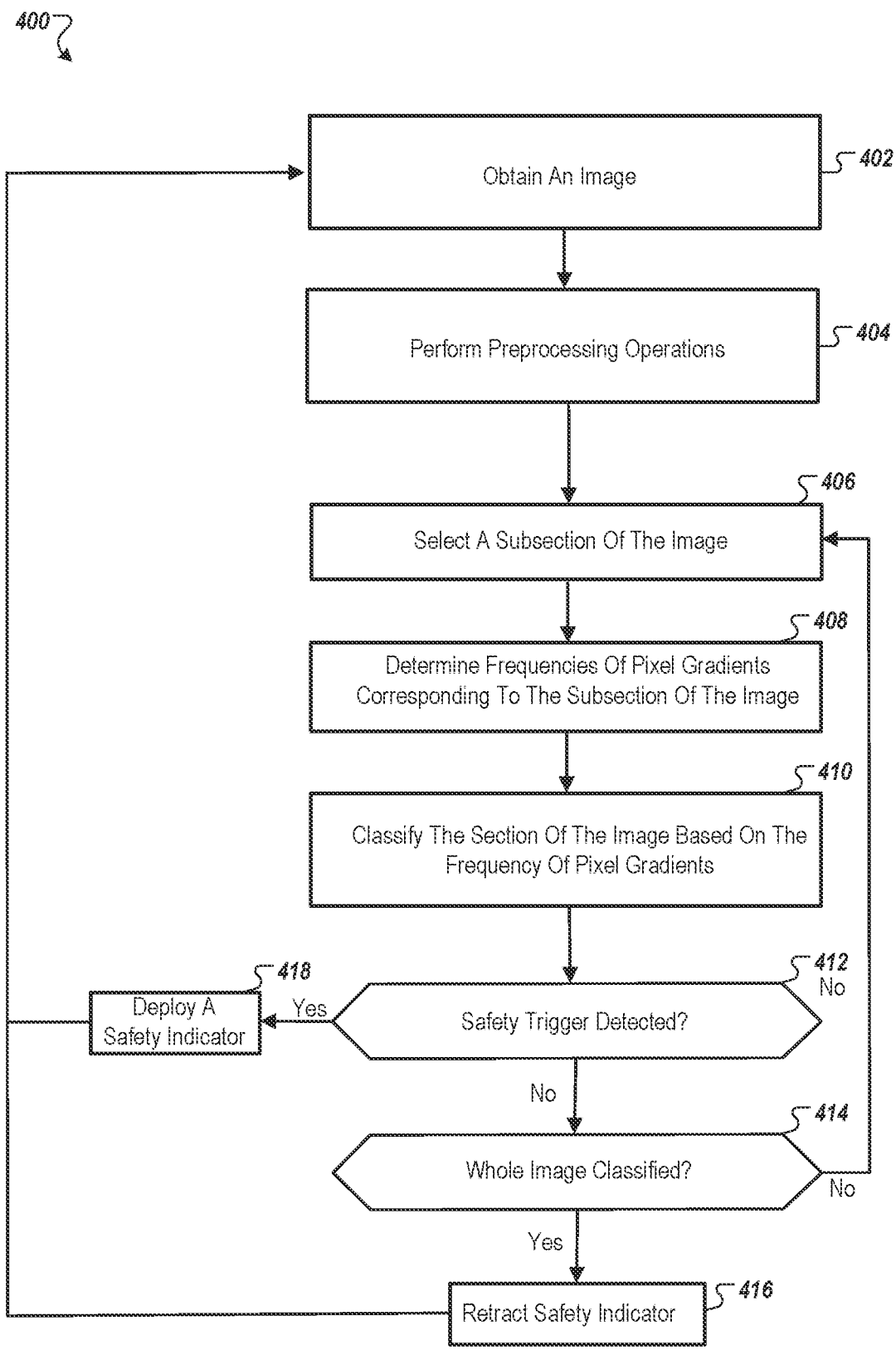
FIG. 4 illustrates a flow chart of an example method of detecting a safety trigger based on image data and deploying a safety indicator corresponding to the detected safety trigger.

FIG. 4 illustrates an exemplary flow chart of an example method 400 of detecting a safety trigger based on image data and deploying a safety indicator corresponding to the detected safety trigger. One or more operations of the method 400 may be performed by any suitable system, apparatus, or device such as, for example the spotting system 104 described and/or illustrated with respect to FIG. 1, the spotting system 304, the detection subsystem 310, the output subsystem 320, the perception module 312, the machine learning model 314, the control module 316, and/or the control panel 318 that may be described and/or illustrated with respect to FIG. 3, and/or the computing device(s) described with respect to FIG. 6, in the present disclosure. The method 400 may include one or more blocks 402, 404, 406, 408, 410, 412, 414, and 416. Although illustrated in discrete blocks, the steps and operations associated with one or more of the blocks of the method 400 may be divided into additional blocks, combined into fewer blocks, or eliminated, depending on the particular implementation.

In some exemplary embodiments, the method 400 may begin at block 402, at block 402 an image may be obtained. In some exemplary embodiments, the image that may be obtained may be an example of the input data 102 and/or 302 described and/or illustrated further in the present disclosure, such as, for example, with respect to FIGS. 1 and 3. In some exemplary embodiments, the image may be a collection of pixel data corresponding to a particular frame of data associated with a particular environment. In some exemplary embodiments, the image may be a frame of data corresponding to a particular time stamp included in a collection of images—e.g., one frame of pixel data corresponding to a video stream.

In some exemplary embodiments, the new image may be received from one or more image sensors. In some exemplary embodiments, the one or more image sensors may include charge-coupled devices (CCD), complementary metal oxide semiconductor (CMOS) sensors, and other image sensors that may be configured to generate one or more collections of pixels corresponding to a particular environment. In some exemplary embodiments, the one or more image sensors may be included in one or more machines, devices, systems, etc. that may be used in connection with one or more image sensors—e.g., cameras, mobile devices, computers, and other systems that may be configured to use and/or direct one or more image sensors to generate image data corresponding to the obtained image.

For example, the obtained image may include pixel data corresponding to one time stamp where the obtained image may have been generated using one or more image sensors. Continuing the example, the image may correspond to pixel data depicting a scene corresponding to an environment behind the back of a boat and including one or more individuals being towed behind the boat—e.g., wakeboarding, water skiing, tubing etc.

At block 404, one or more preprocessing operations may be performed corresponding to the obtained image. In some exemplary embodiments, the one or more preprocessing operations may include cropping, resizing, normalizing one or more pixel values, converting the image from color to grayscale images, filtering the image data, histogram equalization, and other pre-processing operations that may be performed using the obtained image. In some exemplary embodiments, the one or more preprocessing operations may be performed using the obtained image such that the obtained image may be analyzed, characterized, and/or classified using one or more machine learning models (e.g., the one or more machine learning models 314). In some exemplary embodiments, the obtained image may be resized to comport with one or more training datasets that may be used to train one or more machine learning models.

For example, continuing in the context of the obtained image depicting the scene behind the boat, one or more preprocessing operations may be performed to resize the image to be analyzed by one or more machine learning models—e.g., resized to 64×128 pixels. Further continuing the example, the preprocessing operations may be to convert the obtained image from a color image to a grayscale image.

At block 406, a subsection of the obtained image may be selected. In some exemplary embodiments, the obtained image may be divided into one or more subsections of pixel data. In some exemplary embodiments, the one or more subsections may include equal amounts of pixel data. In some exemplary embodiments, the one or more subsections may be selected sequentially or in some other ordered manner. In some exemplary embodiments, the one or more subsections of the obtained image may be selected using the spotting system 104, the spotting system 304, the detection subsystem 310, and/or the perception module 312 described further in the present disclosure, such as, for example, with respect to FIGS. 1 and 3.

Continuing the example in the context of the obtained image as a depiction of a scene behind the back of a boat, the obtained image may be split, divided, or determined to include one or more subsections of pixels, for example, subsections of the obtained image including equal number of pixels. Further, the subsections may depict one or more portions of the scene—e.g., a subsection including the water, a subsection including part of the individual being towed behind the boat, etc.

At block 408, one or more frequencies of pixel gradients may be determined where the pixel gradients may correspond to the selected subsection of the obtained image. In some exemplary embodiments, one or more gradients may be determined corresponding to one or more pixels corresponding to the selected subsection of the obtained image. In some exemplary embodiments, a respective pixel gradient may be determined for each of the pixels corresponding to the subsection of the obtained image. In some exemplary embodiments, the one or more pixel gradients may include a magnitude and direction corresponding to the pixel gradient such that one or more vectors may be determined. In some exemplary embodiments, the determining the pixel gradients may show and/or illustrate changes in contrast between pixels corresponding to the selected subsection of the obtained image. For example, a large pixel gradient may indicate an edge corresponding to one or more objects in the selected subsection of the obtained image.

Additionally or alternatively, the one or more frequencies of pixel gradients may be clustered and/or categorized in one or more data structures. In some exemplary embodiments, the one or more frequencies of pixel gradients may be determined using one or more feature extraction techniques used in applications, such as, computer vision and/or image processing. For example, Histogram of Oriented Gradients (HOG) feature extraction, local binary patterns (LBP), Scale-Invariant Feature Transform (SIFT), and other feature extraction techniques may be used to determine the one or more frequencies of pixel gradients corresponding to the selected subsection of the obtained image. In these or other embodiments, determining the one or more frequencies of pixel gradients may be performed using the perception module 312 described and/or illustrated further in the present disclosure, such as, for example, with respect to FIG. 3.

At block 410, one or more characteristics corresponding to the selected subsection corresponding to the obtained image may be classified. In some exemplary embodiments, the one or more characteristics may be classified based on the determined frequencies of pixel gradients corresponding to the selected subsection of the obtained image. In some exemplary embodiments, the one or more characteristics may include a presence of one or more objects, individuals, and any other circumstances that may be detected and classified corresponding to the selected subsection of the obtained image. In these or other embodiments, the one or more machine learning models 314 may be used to classify the selected subsection of the obtained image as described and illustrated further in the present disclosure, such as, for example, with respect to FIG. 3.

For example, continuing in the context of the obtained image including an individual being towed behind a boat, it may be determined that the subsection of the image includes at least a portion of the individual that may be towed behind the boat. Further continuing the example, the determination that at least a part of the individual may be detected in the selected subsection of the obtained image based on one or more frequencies of pixel gradients, and/or one or more vectors including a magnitude and direction corresponding to respective pixel gradients in the subsection of the obtained image.

At block 412, it may be determined whether one or more safety triggers may be detected. In some exemplary embodiments, the determination may be made based on the classifying the subsection of the obtained image. In some embodiments, the safety trigger that may be detected may be the same as and/or analogous to safety triggers 108 and/or safety triggers 324 that may be described and/or illustrated further in the present disclosure, such as, for example, with respect to FIGS. 1 and 3.

For example, continuing in the context of the obtained image depicting a scene of one or more individuals towed behind a boat, one of the safety triggers may be that the one or more individuals fall or otherwise stop being towed by the boat. Continuing the example, the selected subsection of the obtained image may indicate that the individual may be in the water or otherwise not present in the obtained image. Further, because the individual may not be detected, it may be determined that one or more safety triggers may exist. Additionally or alternatively, it may be determined that the individual remains upright and towed behind the boat (e.g., wakeboarding water skiing, tubing, etc.) and, in response to determining that the person remains in the selected subsection of the obtained image, it may be determined that one or more safety triggers do not exist corresponding to the selected subsection of the obtained image.

In some exemplary embodiments, in response to the safety triggers not being present in the selected subsection of the obtained image, the method 400 may proceed to block 414. In response to a determination that one or more safety triggers may be present in the selected subsection of the obtained image, the method 400 may proceed to block 418.

At block 418, in response to a determination that the selected subsection may include one or more safety triggers, one or more safety indicators may be deployed. In these or other embodiments, the one or more safety indicators may be the same as and/or analogous to safety indicators 110 and/or safety indicators 326 described and/or illustrated further in the present disclosure, such as, for example, with respect to FIGS. 1 and 3. In some exemplary embodiments, in response to the safety indicator being deployed, the method 400 may proceed to block 402 where another image may be obtained.

At block 414, a determination may be made as to whether the whole image may have been classified. In some embodiments, whether the whole image may have been classified may be based on whether each of the subsections corresponding to the obtained image may have been classified. In response to a determination that the whole image may not have been classified, the method 400 may proceed to block 406 where another subsection of the obtained image may be selected. In response to a determination that the whole image may have been classified, the method 400 may proceed to block 416.

At block 416, the one or more safety indicators may be retracted and/or otherwise not deployed. For example, continuing in the context of the obtained image depicting one or more individuals towed behind a boat, one or more safety indicators may have been deployed in response to one or more previous images including one or more safety indicators. Further continuing the example, the obtained image may indicate that the individual is again upright and being towed behind the boat, in response to the safety indicator no longer being present, the safety indicator may be retracted— e.g., an orange flag may be lowered, a flashing light may be turned off, a horn may stop sounding, a rear facing camera may be turned off etc. Additionally or alternatively, one or more safety indicators may not have been deployed and, in response to a determination that one or more safety triggers may not be detected, the one or more safety indicators may not be deployed. In some exemplary embodiments, in response to retracting or otherwise not deploying one or more safety indicators, the method 400 may proceed to block 402 where another image may be obtained.

Modifications, additions, or omissions may be made to one or more operations included in the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 5:
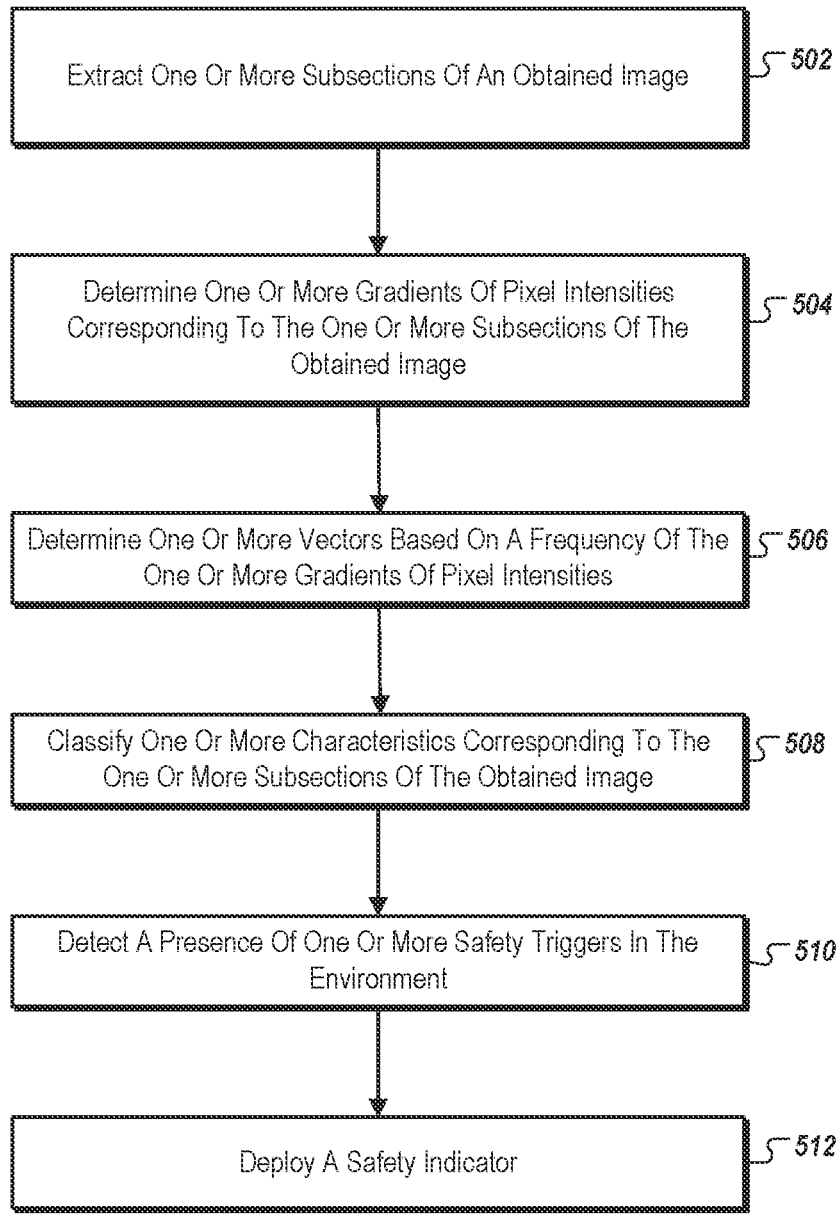
FIG. 5 illustrates a flow chart of an example method of deploying a safety indicator corresponding to the detected safety trigger.

FIG. 5 illustrates a flow chart of an example method 500 of deploying a safety indicator corresponding to the detected safety trigger. One or more operations of the method 500 may be performed by any suitable system, apparatus, or device such as, for example the spotting system 104 described and/or illustrated with respect to FIG. 1, the spotting system 304, the detection subsystem 310, the output subsystem 320, the perception module 312, the machine learning model 314, the control module 316, and/or the control panel 318 that may be described and/or illustrated with respect to FIG. 3, and/or the computing device(s) described with respect to FIG. 6, in the present disclosure. The method 500 may include one or more blocks 502, 504, 506, 508, 510, and 512. Although illustrated in discrete blocks, the steps and operations associated with one or more of the blocks of the method 500 may be divided into additional blocks, combined into fewer blocks, or eliminated, depending on the particular implementation.

In some exemplary embodiments, the method 500 may include block 502, at block 502, one or more subsections of an obtained image (e.g., an image obtained using the environmental sensor 308 may be extracted. In some embodiments, the obtained image may correspond to an environment. In exemplary these or other embodiments, the image may be obtained using the environmental sensor 308 and/or be included in the input data 302 and/or the input data 102 that may be described and/or illustrated further in the present disclosure, such as, for example, with respect to FIGS. 1 and 3.

At block 504, one or more gradients of pixel intensities may be determined. Further, in some exemplary embodiments, the one or more gradients of pixel intensities may correspond to the one or more subsections of the obtained image. In some exemplary embodiments, the gradients of pixel intensities may be determined using the perception module 312 described and/or illustrated further in the present disclosure, such as, for example, with respect to FIG. 3.

At block 506, one or more vectors may be determined based on a frequency of the one or more gradients of pixel intensities that may correspond to the one or more subsections corresponding to the obtained image. In these or other embodiments, the determined frequency of the pixel intensities and the determination of the one or more vectors may be described and/or illustrated further in the present disclosure, such as, for example, with respect to FIG. 3.

At block 508, one or more characteristics corresponding to the one or more subsections of the obtained image may be classified, e.g., using the one or more machine learning models described and/or illustrated in FIG. 3. In some exemplary embodiments, the one or more characteristics may be classified based on the one or more determined vectors.

At block 510, a presence of one or more safety triggers in the environment may be detected. In some exemplary embodiments, the one or more safety triggers may be detected based on one or more classified characteristics corresponding to the one or more subsections of the obtained image. In some exemplary embodiments, one or more safety indicators may be deployed based on detecting the one or more safety triggers in the environment and the classifying the one or more characteristics corresponding to the one or more subsections of the obtained image. In these or other embodiments, the detecting the presence of one or more safety triggers in the environment may be described and/or illustrated further in the present disclosure, such as, for example, with respect to FIGS. 1-4.

At block 512, one or more safety indicators may be deployed. In some exemplary embodiments, the one or more safety indicators may be automatically deployed based on the detecting the presence of the one or more safety triggers in the environment. In these or other embodiments, deploying one or more safety indicators may be described and/or illustrated further in the present disclosure, such as, for example, with respect to FIGS. 1-4.

Modifications, additions, or omissions may be made to one or more operations included in the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 6:
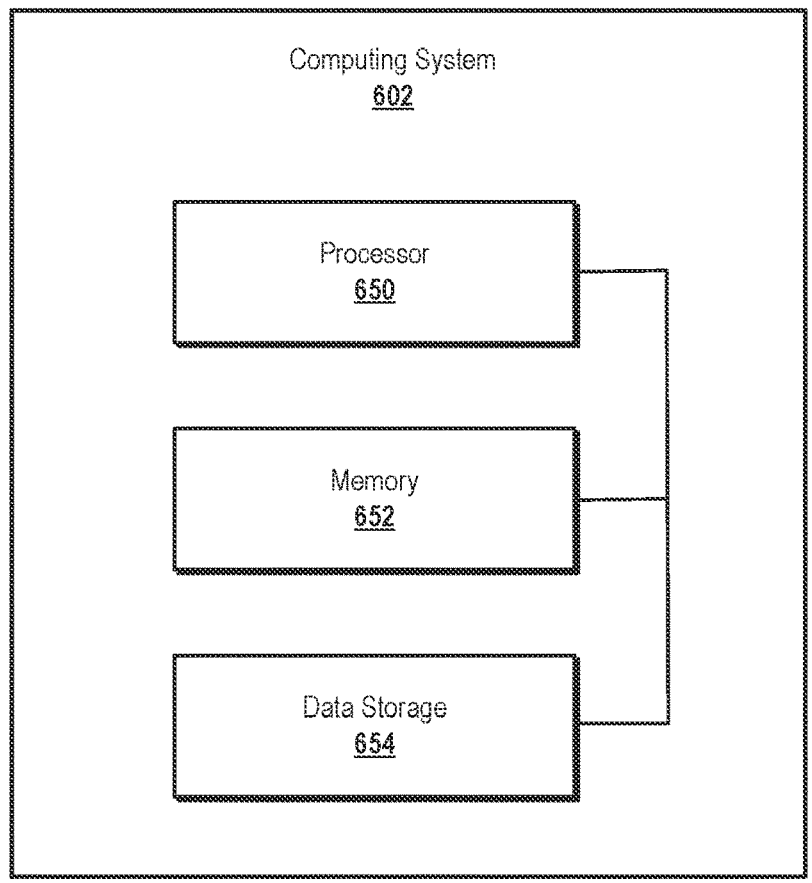
FIG. 6 illustrates a block diagram of an example computing system.

FIG. 6 illustrates a block diagram of an example computing system 602. The computing system 602 may be configured to implement or direct one or more suitable operations described in the present disclosure. For example, the computing system 602 may be used in various elements of the above disclosure (e.g., the question generation module 102, the feature engineering module 110, the language model 106, the machine learning model 114, the language training module 116, and/or other systems capable of performing one or more operations or actions in the disclosed embodiments). In some exemplary embodiments, the computing system 602 may be used to control operations related to generating new data corresponding to a new data subset for the dataset. In these and other embodiments, the computing system 602 may be used to train a machine learning model using the dataset including the new data subset. The computing system 602 may include a processor 650, a memory 652, and a data storage 654. The processor 650, the memory 652, and the data storage 654 may be communicatively coupled.

In general, the processor 650 may include any suitable computer, computing entity, or processing device including various computer hardware or software modules and may be configured to execute instructions stored on any applicable computer-readable storage media. For example, the processor 650 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 6, the processor 650 may include any number of processors configured to, individually or collectively, perform or direct performance of any number of operations described in the present disclosure. Additionally, one or more of the processors may be present on one or more different electronic devices, such as different servers.

In some exemplary embodiments, the processor 650 may be configured to interpret and/or execute program instructions and/or process data stored in the memory 652, the data storage 654, or the memory 652 and the data storage 654. In some embodiments, the processor 650 may fetch program instructions from the data storage 654 and load the program instructions in the memory 652. After the program instructions are loaded into memory 652, the processor 650 may execute the program instructions.

The memory 652 and the data storage 654 may include computer-readable storage media for carrying or having computer-executable instructions or data structures stored thereon. For example, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007).

One or more combinations of the above may also be included within the scope of computer-readable storage media. Computer-executable instructions may include, for example, instructions and data configured to cause the processor 650 to perform a certain operation or group of operations.

Modifications, additions, or omissions may be made to the computing system 602 without departing from the scope of the present disclosure. For example, in some embodiments, the computing system 602 may include any number of other components that may not be explicitly illustrated or described.

Embodiments described in the present disclosure may be implemented using computer-readable media for carrying or having computer-executable instructions or data structures stored thereon. Such computer-readable media may be any available media that may be accessed by a general purpose or special purpose computer. For example, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

Although this invention has been described in terms of certain preferred embodiments, other embodiments apparent to those of ordinary skill in the art are also within the scope of this invention. Accordingly, the scope of the invention is intended to be defined only by the claims which follow.

The invention claimed is:

1. A method comprising:
    extracting one or more subsections of an obtained image corresponding to an environment;
    determining one or more gradients of pixel intensities corresponding to the one or more subsections of the obtained image;
    determining one or more vectors based on a frequency of the one or more gradients of pixel intensities corresponding to the one or more subsections corresponding to the obtained image;
    classifying, using one or more machine learning models, one or more characteristics corresponding to the one or more subsections of the obtained image based on the one or more determined vectors;
    detecting a presence of one or more safety triggers in the environment based on the one or more classified characteristics corresponding to the one or more subsections of the obtained image; and
    automatically deploying a safety indicator based on the detecting the presence of the one or more safety triggers in the environment.

2. The method of claim 1, further comprising:
    monitoring the environment for the one or more safety triggers;
    determining that the one or more safety triggers are absent from the environment; and
    automatically retracting the safety indicator based on determining that the one or more safety triggers are absent from the environment.

3. The method of claim 1, after detecting the presence of one or more safety triggers in the environment, further comprising:
    determining a safety indicator to deploy from a plurality of safety indicators based on the detecting the presence of one or more safety triggers in the environment and the classifying the one or more characteristics corresponding to the one or more subsections of the obtained image.

4. The method of claim 1, prior to extracting one or more subsections of the obtained image, further comprising:
    resizing the obtained image based on a number of pixels included in the obtained image and based on the one or more machine learning models used to classify one or more characteristics corresponding to the obtained image;
    converting the obtained image to a grayscale image; and
    defining a plurality of subsections corresponding to the obtained image, the plurality of subsections respectively including an equal number of pixels.

5. The method of claim 1, wherein automatically deploying the safety indicator includes one or more of raising a flag, sounding an alarm, activating a light, starting a video feed, recording video footage corresponding to the environment, stopping one or more systems associated with the environment.

6. The method of claim 1, wherein the one or more safety triggers include one or more of a person or object falling in water, tension in a tow rope losing tension, a vehicle traveling in reverse, a presence or absence of a person in the environment, and a presence or an absence of an object in the environment.

7. The method of claim 1, wherein the environment is an area on and behind a moving boat.

8. One or more non-transitory computer-readable storage media configured to store instructions that, in response to being executed, cause a system to perform operations, the operations comprising:
    extracting one or more subsections of an obtained image corresponding to an environment;
    determining one or more gradients of pixel intensities corresponding to the one or more subsections of the obtained image;
    determining one or more vectors based on a frequency corresponding to the one or more gradients of pixel intensities corresponding to the one or more subsections corresponding to the obtained image;
    classifying, using one or more machine learning models, one or more characteristics corresponding to the one or more subsections of the obtained image based on the one or more determined vectors;
    detecting a presence of one or more safety triggers in the environment based on the one or more classified characteristics corresponding to the one or more subsections of the obtained image; and
    automatically deploying a safety indicator based on the detecting the presence of the one or more safety triggers in the environment.

9. The one or more non-transitory computer-readable storage media of claim 8, the operations further comprising:
    monitoring the environment for the one or more safety triggers;
    determining that the one or more safety triggers are absent from the environment; and
    automatically retracting the safety indicator based on determining that the one or more safety triggers are absent from the environment.

10. The one or more non-transitory computer-readable storage media of claim 8, after detecting the presence of one or more safety triggers in the environment, the operations further comprising:
    determining a safety indicator to deploy from a plurality of safety indicators based on the detecting the presence of one or more safety triggers in the environment and the classifying the one or more characteristics corresponding to the one or more subsections of the obtained image.

11. The one or more non-transitory computer-readable storage media of claim 8, prior to extracting one or more subsections of the obtained image, the operations further comprising:
    resizing the obtained image based on a number of pixels included in the obtained image and based on the one or more machine learning models used to classify one or more characteristics corresponding to the obtained image;
    converting the obtained image to a grayscale image; and
    defining a plurality of subsections corresponding to the obtained image, the plurality of subsections respectively including an equal number of pixels.

12. The one or more non-transitory computer-readable storage media of claim 8, wherein automatically deploying the safety indicator includes one or more of raising a flag, sounding an alarm, activating a light, starting a video feed, recording video footage corresponding to the environment, stopping one or more systems associated with the environment.

13. The one or more non-transitory computer-readable storage media of claim 8, wherein the one or more safety triggers include one or more of a person or object falling in water, tension in a tow rope losing tension, a vehicle traveling in reverse, a presence or absence of a person in the environment, and a presence or an absence of an object in the environment.

14. The one or more non-transitory computer-readable storage media of claim 8, wherein the environment is an area on and behind a moving boat.

\* \* \* \* \*